(12) United States Patent
Janz et al.

(10) Patent No.: US 9,294,300 B2
(45) Date of Patent: Mar. 22, 2016

(54) TOKEN BASED COMMUNICATION IN DAISY CHAIN CONFIGURED BATTERY MANAGEMENT DEVICES

(75) Inventors: Thomas Janz, Ulm (DE); Christian Bechter, Ulm (DE); Alexander Scholz, Ulm (DE)

(73) Assignee: Atmel Corporation, San Jose, CA (US)

( * ) Notice: Subject to any disclaimer, the term of this patent is extended or adjusted under 35 U.S.C. 154(b) by 792 days.

(21) Appl. No.: 13/442,446

(22) Filed: Apr. 9, 2012

(65) Prior Publication Data
US 2013/0265009 A1   Oct. 10, 2013

(51) Int. Cl.
*H02J 7/00* (2006.01)
*H04L 12/417* (2006.01)
*H04Q 9/00* (2006.01)

(52) U.S. Cl.
CPC .............. *H04L 12/417* (2013.01); *H04Q 9/00* (2013.01); *H02J 2007/0098* (2013.01); *H04Q 2209/10* (2013.01); *H04Q 2209/30* (2013.01)

(58) Field of Classification Search
USPC ........................................................ 320/134
See application file for complete search history.

(56) References Cited

U.S. PATENT DOCUMENTS 8,327,201 B1 * 12/2012 Lai ................................ 714/725
2002/0064163 A1 * 5/2002 Fujiyama et al. ............. 370/400
2009/0146610 A1 * 6/2009 Trigiani ........................ 320/119
2011/0255549 A1 * 10/2011 Nakamura et al. ............ 370/401
2012/0076146 A1 * 3/2012 Rohatschek et al. .......... 370/392

OTHER PUBLICATIONS

Atmel Corporation, "Li-Ion, NiMH Battery Measuring, Charge Balancing and Power-supply Circuit," Atmel ATA6870, 9116D-AUTO-3/11, pp. 1-55 (2001).
Intersil Selection Guide, Automotive Products, Certified Management System, 3 pages, (Q3/Q4 2011).
Linear Technology Corporation, LTC6803-1/LTC6803-3, "Multicell Battery Stack Monitor," pp. 1-40 (2011).
Maxim Integrated Products "12-Channel, High-Voltage Sensor, Smart Data-Acquisition Interface," MAX11068, pp. 1-82 (2010).

* cited by examiner

*Primary Examiner* — Richard Isla Rodas
*Assistant Examiner* — David V Henze-Gongola
(74) *Attorney, Agent, or Firm* — Fish & Richardson P.C.

(57) ABSTRACT

A battery management and protection system includes a string of battery management and protection integrated circuit devices that may be connected to one another in a daisy chain configuration. Some of the devices can be electrically connected to one or more battery cells. Each device includes an inter-device communication interface comprising a daisy chain line driver. The system includes a controller external to the string of devices and a bi-directional connection lines connecting each device in the string to an upstream and/or downstream device in the string. The system can allow the external controller to access any single one of the devices in the daisy chain, any subset of the devices in the daisy chain, or all the devices in the daisy chain using a single command that is transmitted from one device to the next over a bi-directional connection line.

31 Claims, 6 Drawing Sheets

50 ↘

Single Device

| ChipID1 | ChipID0 |
|---|---|
| 00000000 | 00000001 |

All Devices

| ChipID1 | ChipID0 |
|---|---|
| 11111111 | 11111111 |

| ChipID1 | ChipID0 |
|---|---|
| 10000000 | 00000011 |

FIG. 4C

TOKEN BASED COMMUNICATION IN DAISY CHAIN CONFIGURED BATTERY MANAGEMENT DEVICES

BACKGROUND

This disclosure relates to inter-device communication in a battery management and protection system.

Some devices and systems, such as hybrid electrical vehicles, use multi-cell battery stacks. Such battery stacks may include, for example, battery cells coupled to one or more integrated circuit (IC) devices. The devices typically include a controller (e.g., a microcontroller) and circuitry and provide, among other things, battery cell management and protection. In applications that require or use multiple IC devices to handle the battery cells, the IC devices may be connected to a microcontroller in a daisy chain configuration communication.

SUMMARY

The present disclosure describes techniques that, in some implementations, allow an external controller to access any single one of multiple battery management and protection integrated circuit devices in a daisy chain, any subset of the devices in the daisy chain, or all the devices in the daisy chain using a single command that is transmitted from one device to the next over a bi-directional connection line.

For example, in one aspect, a method includes receiving, in a first device in a string of battery management and protection integrated circuit devices connected to one another in a daisy chain configuration, a message initiated from an external controller, the message being addressed to one or more of the devices. The method includes passing the message up the string from one device to the next over a bi-directional connection line until all the devices in the string have received the message, and executing, by the one or more devices to which the message is addressed, a command contained in the message.

In some implementations, the bi-directional connection line is a single bit bi-directional connection line. In some implementations, the external controller serves as the master for initiating upstream communications, whereas the topmost device in the chain serves as the master for initiating downstream communications.

According to another aspect, a battery management and protection system comprises a string of battery management and protection integrated circuit devices connected to one another in a daisy chain configuration. At least some of the devices are electrically connected to one or more battery cells, and each device includes an inter-device communication interface comprising a daisy chain line driver. The system includes a controller external to the string of devices and a single bit bi-directional connection lines connecting each device in the string to an upstream and/or downstream device in the string. The bottommost device in the string is operable to receive a message initiated from the controller and addressed to one or more of the devices in the string. The communication interfaces of the devices are operable to pass the message up the string from one device to the next over the bi-directional connection line until all the devices in the string have received the message. The one or more devices to which the message is addressed are operable to execute a command contained in the message.

In some implementations, the daisy chain line driver of the communication interface of each device in the string is operable to transmit a data frame over the bi-directional connection line in a direction toward the first device in the string. The topmost device in the string serves as a master for initiating transmissions from the devices to be sent in the direction of the bottommost device, and transmissions from the devices over the bi-directional connection line in the direction of the first device use a token-based communication technique.

One or more of the following advantages are present in some implementations. For example, some implementations allow an external controller to access any single one of the devices in the daisy chain, any subset of the devices in the chain, or all the devices in the chain using a single command that is transmitted from one device to the next over a single bit bi-directional connection line. Furthermore, a protocol for returning data from the devices to the external controller can use the same bi-directional connection line.

Other aspects, features and advantages will be apparent from the following detailed description, the accompanying drawings, and the claims.

BRIEF DESCRIPTION OF THE DRAWINGS

FIGS. 4A, 4B and 4C illustrate examples of a chip identification section of a message from a microcontroller.

DETAILED DESCRIPTION

Figures 1, 2:
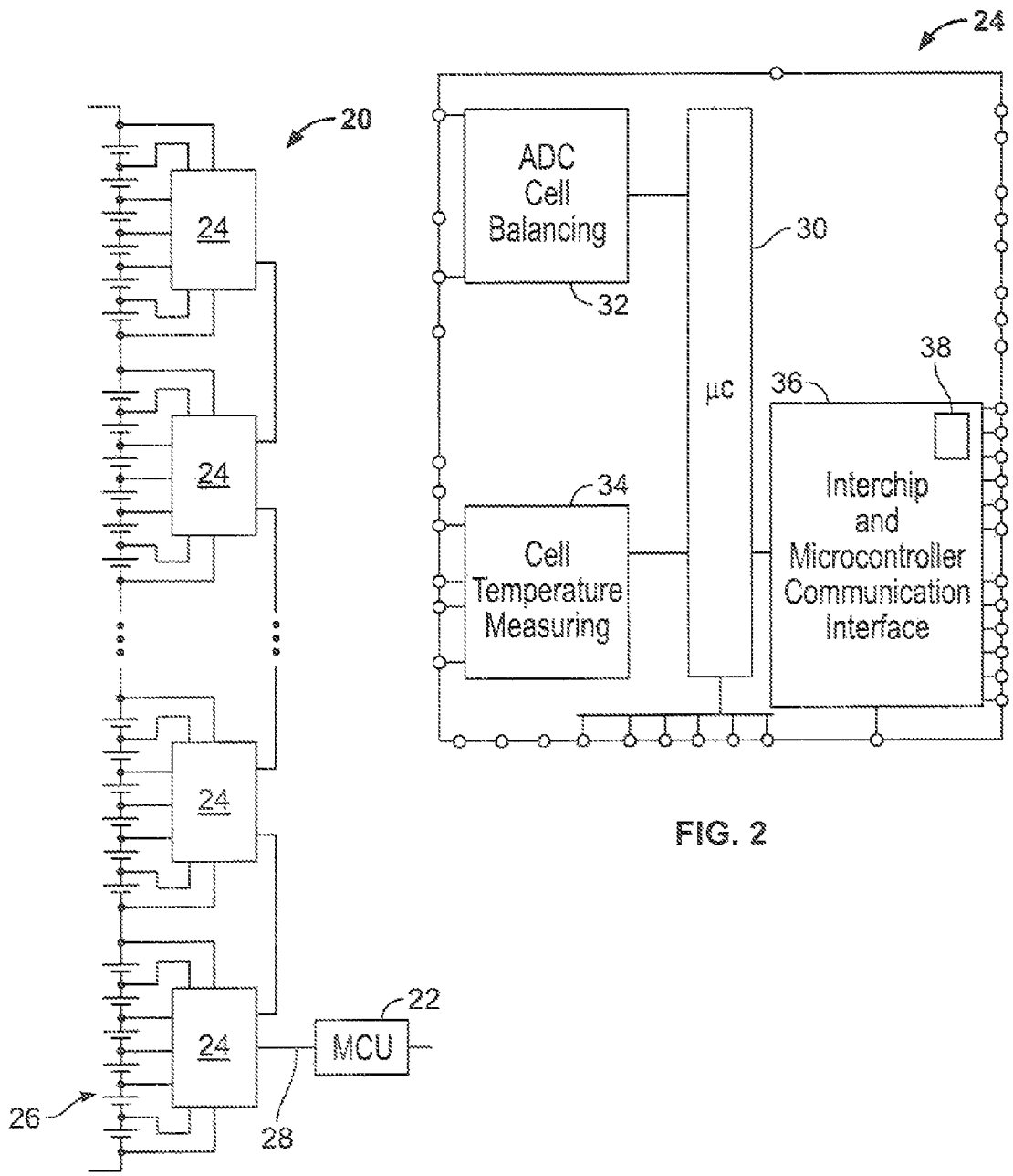
FIG. 1 illustrates a string of battery management and protection integrated circuit devices in a daisy chain configuration.
FIG. 2 is a block diagram illustrating examples of components of a battery management and protection integrated circuit device.

As shown in FIG. 1, a multi-cell battery stack 20 includes a microcontroller (MCU) 22 connected to a string of battery management and protection IC devices 24, which are connected to one another, for example, in a daisy chain configuration. In some implementations, the daisy chain can include up to sixteen IC devices 24, each of which may be implemented as a semiconductor chip; in other implementations, a different number of IC devices 24 may be included in the chain. Each battery management and protection IC device 24 may be electrically connected to one or more battery cells 26 (e.g., Li-ion (Lithium ion) battery cells).

In the illustrated example, communication with MCU 22 is carried out through the bottommost IC device 24 in the daisy chain over a serial peripheral interface (SPI) or other bus 28. The data then can be passed up the chain from one IC device 24 to the next using a communication interface implemented inside each IC device 24. Likewise, data can be passed down the chain from one IC device 24 to the next using the communication interface implemented inside each IC device 24. Thus, commands from MCU 22 are transmitted up the chain of IC devices 24, and data from the IC devices is transmitted down the chain back to MCU 22. In general, MCU 22 serves as the master for initiating upstream communications; whereas the topmost IC device 24 (i.e., the IC device at the far end of the chain from MCU 22) serves as the master for initiating downstream communications.

As shown in FIG. 2, in some implementations, each battery management and protection IC device 24 includes its own microcontroller (µC) 30, which may be implemented, for example, as a combination of hardware and software. IC device 24 also can include non-volatile memory and other circuit components integrated in a single integrated circuit. For example, some implementations may include analog-to-digital (ADC) cell balancing circuitry 32 and battery cell temperature measuring circuitry 34 to facilitate monitoring and management of various characteristics of battery cells 26. IC device 24 also includes an interchip and microcontroller communication interface 36 that, among other things, allows IC device 24 to communicate with one or more other IC devices 24 in the daisy chain and, in the case of the lowest IC device in chain, to communicate directly with the MCU 22. The interface 36 includes a daisy chain line driver 38. In addition, each IC device 24 includes multiple input/output pins. IC device 24 also may include other components.

Figure 3:
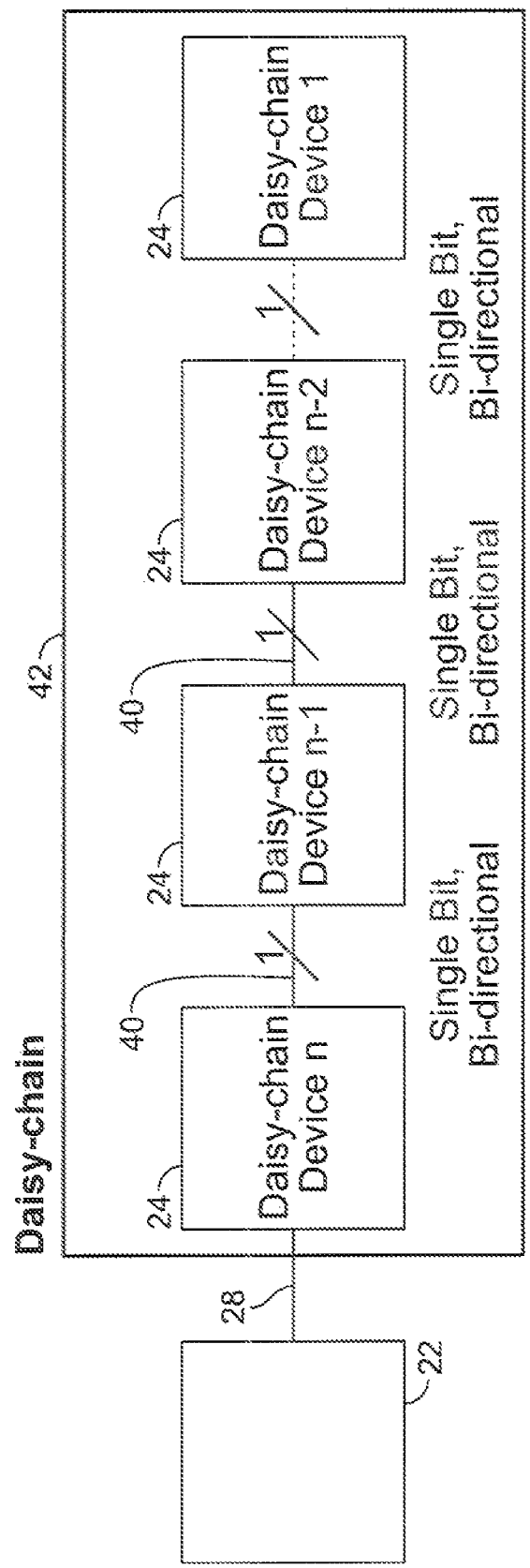
FIG. 3 illustrates an example of a string of devices in a daisy chain configuration that communicate over a single bit bi-directional connection line.

As illustrated in FIG. 3, communication between the various battery management and protection IC devices 24 in the daisy chain 42 takes place over the daisy chained connection using a single bit, bidirectional connection line 40 between the devices 24. Furthermore each interface can operate in one of the following states: idle_UP, active_UP, idle_DOWN and active_DOWN.

In the idle_UP state, interface 36 is transparent for transmissions in the upward direction (i.e., transmissions in the direction from the bottommost device 24 to the topmost device 24 in chain 42). In the idle_UP state, which serves as the default state in some implementations, line driver 38 is activated for transmissions in the upward direction, but no data is transmitted. In the active_UP state, interface 36 is transparent for transmissions in the upward direction. In the active_UP state, line driver 38 is activated for transmissions in the upward direction and data is transmitted.

In the idle_DOWN state, interface 36 is transparent to transmissions in the downward direction (i.e., transmissions in the direction from the topmost device 24 to the bottommost device 24 in chain 42). In the idle-DOWN state, line driver 38 is activated for transmissions in the downward direction, but no data is transmitted. In the active_DOWN state, interface 36 is transparent to transmissions in the downward direction. In the active DOWN state, line driver 38 is activated for transmissions in the downward direction and data is transmitted.

For example, in some implementations, prior to MCU transmitting a message for one or more of devices 24, interface 36 of each device 24 is its default state (i.e., the idle_UP state), If a message is transmitted up the chain, interface 36 changes to the active_UP state. When data is to be read-out and sent from the devices 24 back down chain 42 toward MCU 22, interface 36 initially is in the idle-DOWN state. During transmission of data in the downward direction, interface 36 changes to the active_DOWN state. Daisy chain idle detection can be used for protocol handling and triggering synchronous device, functionality.

Each device 24 in daisy chain 42 is assigned a different address, which can be based, for example, on the position of the device within the chain. For example, assuming that there are sixteen devices 24 in the daisy chained connection 42, a single device, any subset of the devices or all the devices can be addressed using a message that includes a two-byte (i.e., sixteen bits) chip identification. For example, a message (e.g., a command) from MCU 22 addressed to one or more of the devices 24 would include chip identification section 50, examples of which are illustrated in FIGS. 4A, 4B and 4C.

Each bit in chip identification section 50 indicates whether a particular one of the devices 24 is being addressed. In the illustrated examples, it is assumed that a high bit ("1") indicates that the corresponding device 24 is being addressed, whereas a low bit ("0") indicates that the corresponding device 24 is not being addressed. In some implementations, the import of a bit in chip identification section 50 being high or low may be reversed (i.e., a low bit ("0") would indicate that the device 24 is being addressed, and a high bit ("1") would indicate that the device is not being addressed). In the illustrated examples, the last bit (i.e., the left-most bit) is for the device 24 at the bottom of chain 42 (i.e., the device closest to MCU 22, device "n" in FIG. 3), whereas the first bit (i.e., the right-most bit) is for the device 24 at the top of chain 42 (i.e., the device furthest from MCU 22, device "1" in FIG. 3). Likewise, each of the other bits in the chip identification section 50 of a message from MCU 22 corresponds, in sequence, to another one of the devices 24 in the chain 42. Thus, FIG. 4A illustrates chip identification section 50 of a message from MCU 22 that addresses only a single device 24 (i.e., device "1" in FIG. 3). On the other hand, FIG. 4B illustrates chip identification section 50 of a message from MCU 22 that addresses all sixteen devices 24 (i.e., devices "1" through "n" in FIG. 3). As shown in FIG. 4C, a subset of devices 24 also can be addressed by selecting the bits corresponding to the devices to be addressed. For example, FIG. 4C illustrates the chip identification section 50 of a message from MCU 22 that addresses three devices 24. Thus, a particular message from MCU 22 can address any subset of devices 24 in daisy chain 42. More generally, the communication protocol allows for single, broadcast and mixed device access. Thus, a single message (e.g., a READ command from MCU 22) can be addressed to any one or more of devices 24.

Figure 5:
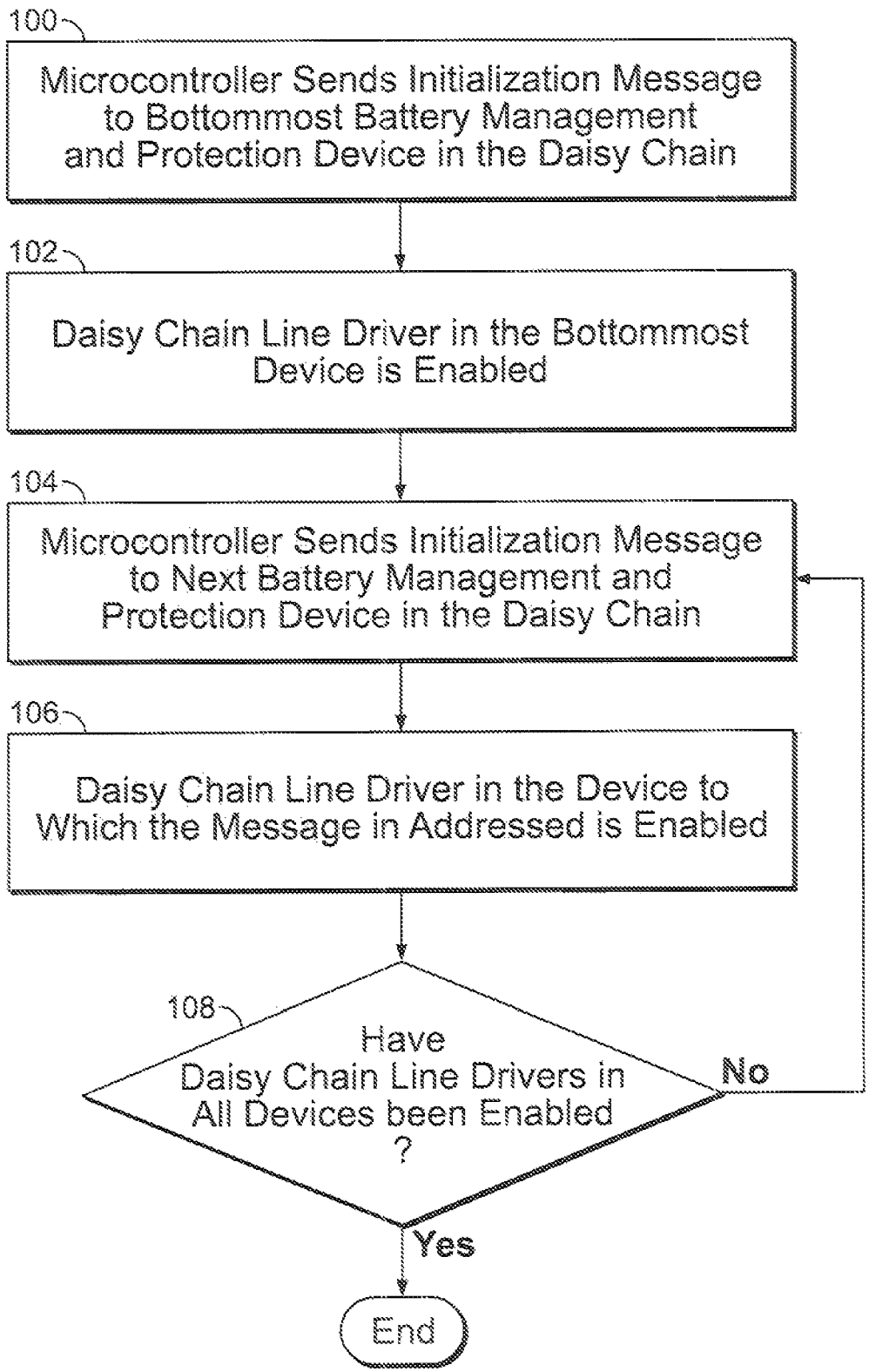
FIG. 5 is a flow chart of an initialization method.

Each daisy chain line driver 38 can be enabled or disabled, thereby allowing all devices 24 in daisy chain 42 to be addressed independently. To illustrate, it is assumed that in an initial state, the daisy chain line driver 38 of each device 24 is disabled. Thus, devices 24 are not yet enabled to communicate with one another over bidirectional connection line 40. As indicated by block 100 in FIG. 5, to initialize and assign respective addresses for devices 24 in the daisy chain 42, MCU 22 first sends an initialization message that contains an initialization command to the bottommost device 24 (i.e., the device 24 closest to MCU 22). In response, the bottommost device (device "n" in FIG. 3) enables its daisy chain line driver 38 and accepts the assigned address (block 102), which renders device n transparent for future initialization messages sent by MCU 22. The foregoing operations are then performed for each device 24 in sequence until daisy chain line drivers 38 in all devices 24 in the chain 42 are enabled. Thus, MCU 22 sends an initialization message that contains an initialization command to the next device 24 in chain 42 (i.e., device "n−1" in FIG. 3) (block 104). This message passes through device "n," whose daisy chain line driver 38 previously was enabled, and is received by device "n−1." Device "n−1" enables its daisy chain line driver 38 and accepts the assigned address (block 106), which renders device "n−1" transparent for future initialization messages sent by MCU 22. MCU 22 determines whether or not the daisy chain line driver 38 in each device 24 has been initialized (block 108). If they have, then the initialization process ends. Otherwise, process blocks 104, 106, 108 are repeated until daisy chain line driver 38 in each device 24 (other than the topmost device (i.e., device "1" in FIG. 3)) is enabled for upward transmissions.

In the event MCU 22 determines or detects that there is a problem during the initialization process, MCU 22 can disconnect the devices from the daisy chain bus system by sending a disable message addressed to all devices 24 simultaneously. This broadcast message causes each device 24 in the daisy chain bus system to disable its daisy chain line driver 38 (if previously enabled). MCU 22 then can restart the initialization process to assign an address to each device 24 in chain 42 and to enable the daisy chain line drivers 38 on devices 24.

Once the daisy chain line drivers 38 in all devices 24 are enabled, MCU 22 can send a message containing a command to one or more of the devices 24. An example of such a command is a READ command that instructs the addressed device(s) to read and return battery cell or other data that the device(s) previously measured. Other types of commands are possible as well, and may instruct the addressed device(s) to return specified type(s) of data to MCU 22. The message is transmitted from MCU 22 to bottommost device "n" over interface 28 and is passed on up the daisy chain to each of the other devices 24 using bidirectional connection line 40. As each device 24 receives the message, its interface 36 changes from idle_UP state to the active_UP state. In some implementations, interface 36 in each device 24 provides very low latency, so that the MCU message is received by all devices 24 substantially at about the same time (i.e., within the inherent limitations due to transmission times). The devices 24 to which the message is addressed then act on the command by executing the operations dictated by the command.

As described above, the topmost device 24 (i.e., device "1" in FIG. 3) serves as the master for initiating downstream communications. Furthermore, the topmost device 24 serves as the master for initiating downstream communications regardless of whether or not the particular message from MCU 22 was addressed to the topmost device. In the illustrated implementation, downstream transmissions from devices 24 to MCU 22 use a token-based protocol that sends the transmissions over bi-directional connection line 40.

Figure 6:
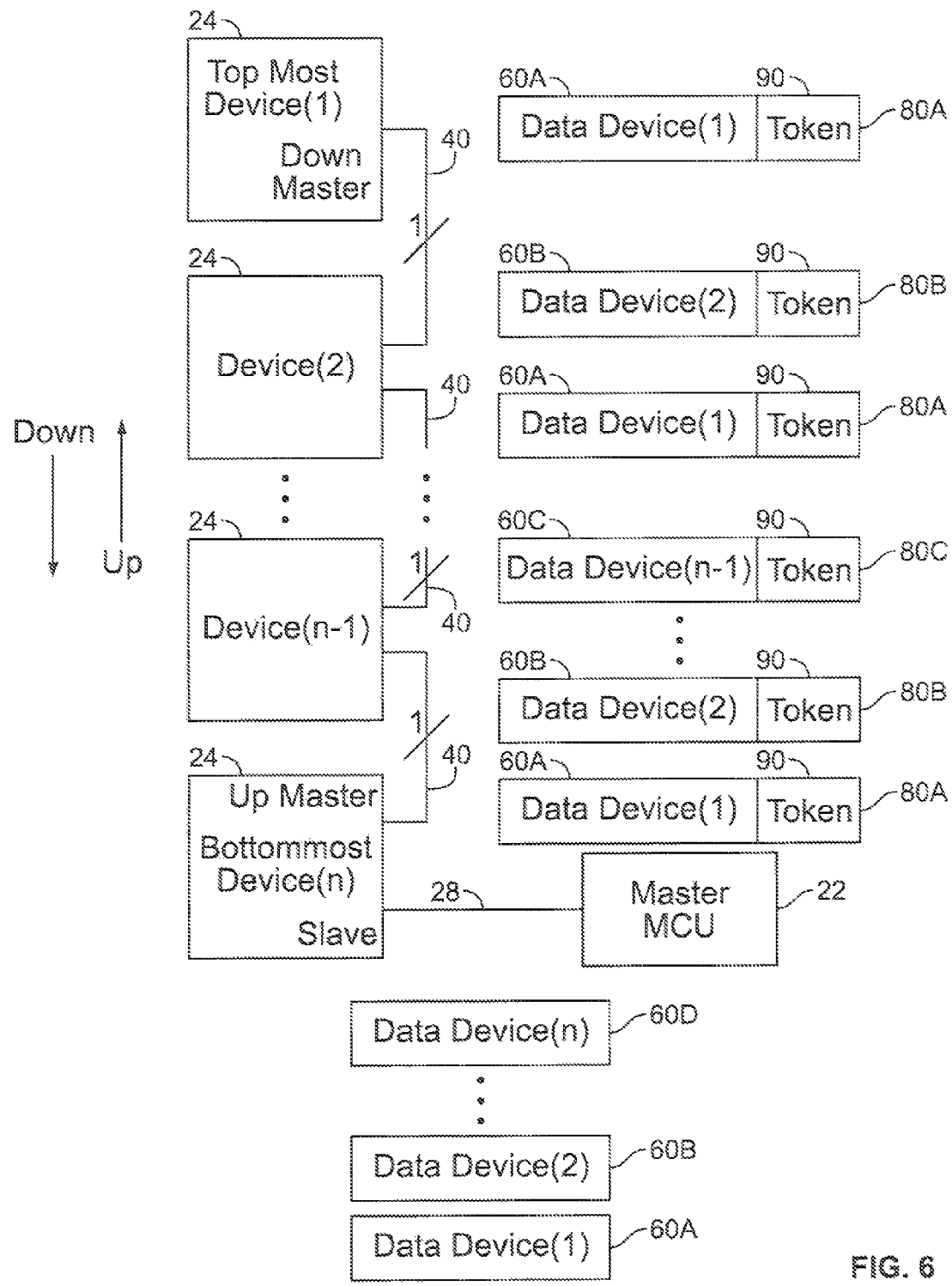
FIG. 6 illustrates further details according to an example of token-based protocol for downstream communications to the microcontroller.

For example, when the topmost device 24 in chain 42 is ready to transmit data in response to a command from MCU 22, the topmost device transmits a data frame 80A containing its data 60A followed by a token 90, which serves to indicate the end of the data (see FIG. 6). Token 90 can include a predefined structure, which interfaces 36 use to detect the end of a data frame.

Data frame 80A containing the data 60A and token is sent from the topmost device 24 (i.e., device "1" in FIG. 6) over single bit bi-directional connection line 40 to the next device 24 in chain 42 (i.e., device "2" in FIG. 6). Immediately following token 90 in data frame 80A from device "1," connection line 40 is in an idle state in which there is no valid data. The idle state can have an arbitrary length, which may depend on the time needed for each device 24 to send its data frame.

Figure 7:
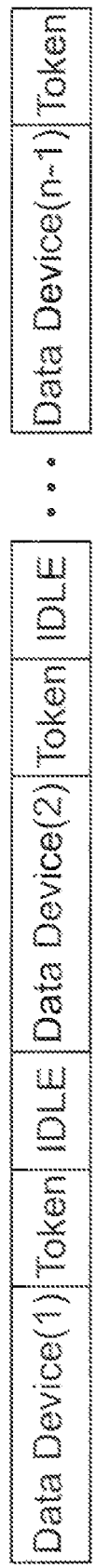
FIG. 7 illustrates an example of the organization of downstream data on the bi-directional connection line.

The passing tokens 90 (or passing idle states) are counted by each device 24 when it is in the idle_DOWN state. If the number of counted tokens 90 (or idle states) matches the position of the particular device 24 in daisy chain 42, the device inserts a data frame containing its data followed by another token at the end of the data stream, and the entire transmission of data frames passes to the next downstream device 24. Thus, for example, device "2" can add a data frame 80B containing data 60B and a token 90 to the end of the data stream, and the data stream (i.e., data frame 80A for device "1", and data frame 80B for device "2") passes to the next downstream device. Interface 36 in device "2" then switches from the active_DOWN state to the idle_UP state. This process continues, with each device 24 in chain 42 adding a data frame (i.e., data (if any) and a token) to the data stream received from the previous device 24. Thus, for example, the second-to-last device 42 (i.e., device "n−1" in FIG. 6) inserts a data frame 80C containing its data 60C and a token 90 to the end of the data stream, and the entire data stream passes to the bottommost device 24 (i.e., device "n" in FIG. 6). FIG. 7 illustrates the organization of data and tokens on the single bit, bidirectional connection line 40 that is received by the bottommost device 24. As noted above, each interface 36 switches from the active_DOWN state to the idle_UP state after counting the expected number of tokens 90 and transmitting its data frame.

Although in some implementations it is preferable for each interface 36 to detect and count the number of passing tokens 90 as indicative of the number of frames that have been received from upstream devices 24, in some implementations, the interfaces may detect and count the number of passing idle states (either in addition to or instead of detecting and counting the number of passing tokens). Such implementations can allow transmission of the data frames to occur even if a token 90 is not detected. On the other hand, detecting idle states may require more time because the idle state does not include a predefined structure.

In some implementations, if a particular one of devices 24 has no data to transmit (for example, because the READ command from MCU 22 was not addressed to that device), then the particular device simply inserts a token 90, but no data, into its data frame. In other implementations, only devices 24 to which the message from MCU 22 was addressed would transmit their data together with a token; however, devices 24 to which the message was not addressed (based on the chip identification section 50 of the message), would not transmit a token. This latter technique can be implemented as follows. Based on the format, for example, of the 16-bit chip identification section 50 of the message from MCU 22, each device 24 in chain 42 knows the number of upstream devices 24 to which the message is addressed. In this technique, each device 24 (other than the topmost device in chain 42) is programmed to count tokens until it reaches a count that corresponds to the number of upstream devices 24 that are expected to transmit data in response to the MCU message. When the expected count is reached, if device 24 has data to transmit in response to the MCU message, the device 24 transmits a data frame, including its data and a token 90, and also changes the state of its line driver 38. On the other hand, if device 24 does not have data to transmit in response to the MCU message, then it simply switches the state of its line driver, but does not send a token.

The bottommost device 42 (i.e., device "n" in FIG. 6) acts as an interface controller and collects the data for all devices 24 in the chain 42 and transfers the data to MCU 22 over interface 28. Device "n" can send the data according to a predetermined order known both to it and MCU 22. For example, device "n" can send the data for devices 24 in sequence, starting with data 60A for topmost device "1" and proceeding, in order, to data 60B for device "2" and finally to its own data 60D. In this way, as MCU 22 receives the stream of data from bottommost device 42, MCU 22 will recognize with which device 24 the data is associated. The stream of data sent to MCU 22 will only include data from those devices 24 to which the READ or other command from MCU 22 was addressed. Since MCU 22 specifies the position of each device 24 within daisy chain 42 and knows which devices 24 were addressed by the command, MCU 22 will be able to recognize which data is associated with each device 24. At this stage, the interface 36 in each device 24 is again in the idle_UP state and is waiting to receive a message with a command from MCU 22.

In some implementations, a timer can provide a timestamp each time an idle detection is made. The timestamp can be calculated for each device 24 in daisy chain 42. The timestamp can have an offset value as well as a position-dependent value. The time stamp can be detected, for example, using the token in the upward direction or the idle_UP detection.

Use of the timestamp can help prevent other system specific tasks or propagation delays from adversely influencing the system. Each device 24 analyzes a received message and, if the message includes a command that needs to be served synchronously, the trigger mechanism is performed. Otherwise, the timer is stopped. Analysis of the command can be performed after the idle detection, but before the synchronization.

Other implementations are within the scope of the claims.

What is claimed is:

1. A method of communicating in a battery management and protection system comprising a string of battery management and protection integrated circuit devices connected to one another in a daisy chain configuration, the string of battery management and protection integrated circuit devices including a first device, one or more intermediate devices, and a last device in that order, the method comprising:
    receiving, in the first one of the devices, a message initiated from an external controller, the message being addressed to one or more of the intermediate devices,
    subsequently passing the message up the string from one device to the next over a bi-directional connection line until all the devices in the string have received the message;
    executing, by the one or more devices to which the message is addressed, a command contained in the message; and
    transmitting, by each device in the string, a data frame over the bi-directional connection line in a downstream direction toward the first device in the string, wherein the last device in the string serves as a master for initiating all downstream data transmissions in response to the message addressed to the one or more of the intermediate devices, and wherein the first device in the string collects the data frames for all the devices in the string and transfers the data to the external controller.

2. The method of claim 1 wherein the bi-directional connection line is a single bit bi-directional connection line.

3. The method of claim 1 wherein the message from the external controller is addressed to more than one device in the string, but fewer than all the devices in the string.

4. The method of claim 1 wherein transmissions from the devices over the bi-directional connection line in the direction of the first device use a token-based communication technique.

5. The method of claim 4 wherein each data frame includes a token.

6. The method of claim 5 wherein the token in the data frame from each device in the string is the same as the token in the data frames from the other devices in the string.

7. The method of claim 5 wherein each device in the string transmits a data frame containing a token regardless of whether or not the message from the external controller was addressed to that device.

8. The method of claim 7 wherein each data frame from the one or more devices to which the message from the external controller was addressed includes measured data followed by the token.

9. The method of claim 8 wherein the bi-directional connection line is a single bit bi-directional connection line.

10. The method of claim 8 including:
    counting, by each device, tokens received on the bi-directional connection line from upstream devices in the string to determine whether a number of counted tokens matches a predetermined number for that device; and
    inserting, by each device, its data frame after it determines that the number of counted tokens matches the predetermined number for that device.

11. The method of claim 10 wherein the predetermined number for each device depends on a position of that device within the string.

12. The method of claim 10 wherein each device in the string includes a communication interface having a first state and a second state, wherein the interface is in the first state when waiting to receive the message initiated from the external controller and changes to the second state after receiving the message initiated from the external controller, wherein the communication interface is transparent for upward transmissions while in the first state or the second state.

13. The method of claim 12 wherein the communication interface has a third state and a fourth state, wherein the communication interface counts the tokens when it is in the third state and changes to the fourth state to transmit data after receiving the predetermined number of tokens based on its position within the string, wherein the communication interface is transparent for downward transmissions while in the third state or the fourth state.

14. The method of claim 4 including:
    counting, by each device, idle states on the bi-directional connection line to determine whether the device should insert its data frame onto the bi-directional connection line; and
    inserting, by each device, its data frame after it determines that the number of counted idle states matches the predetermined number for that device.

15. The method of claim 4 including collecting, by the first device, any data contained in the data frames transmitted by other devices in the string and transmitting the data from the data frames to the external controller in accordance with a predetermined order.

16. The method of claim 1 including assigning, by the external controller, an address to each device in the string based on a position of the device within the string.

17. A method of communicating in a battery management and protection system comprising a string of battery management and protection integrated circuit devices connected to one another in a daisy chain configuration, the string of devices including a first device, one or more intermediate devices, and a last device in that order, wherein each device has a communication interface a daisy chain line driver, the method comprising:
    enabling the daisy chain line driver of each device in the string;
    receiving, in the first one of the devices, a message initiated from an external controller, the message being addressed to one or more of the intermediate devices,
    subsequently passing the message up the string from one device to the next over a single bit bi-directional connection line until all the devices in the string have received the message;
    executing, by the one or more devices to which the message is addressed, a command contained in the message;
    transmitting, by each device in the string, a data frame over the bi-directional connection line in a direction toward the first device in the string, wherein the last device in the string serves as a master for initiating all downstream data transmissions from the devices to be sent in the direction of the first device in response to the message addressed to the one or more of the intermediate devices, and wherein transmissions from the devices over the bi-directional connection line in the direction of the first device use a token-based communication technique.

18. The method of claim 17 wherein the message is addressed only to a subset of the devices in the string.

19. The method of claim 17 wherein enabling the daisy chain line driver of each device includes initializing, by the external controller, the line drivers of the devices sequentially starting with a bottommost device in the string and continuing in an upstream direction until the line driver of each device in the string is initialized.

20. The method of claim 19 wherein each initialization message includes a respective address for the device to which the initialization message is directed.

21. The method of claim 20 wherein, as the daisy chain line driver in a particular device is enabled, the particular device is rendered transparent for subsequent initialization messages until the daisy chain line driver is disabled.

22. The method of claim 17 including broadcasting a daisy chain line driver disable message to all the devices in the string so as to disable the daisy chain line driver in each device through a single message from the external controller.

23. A battery management and protection system comprising:
- a string of battery management and protection integrated circuit devices connected to one another in a daisy chain configuration, the string of devices including a bottommost device, one or more intermediate devices, and a topmost device in that order, wherein at least some of the devices are electrically connected to one or more battery cells, wherein each device includes an inter-device communication interface comprising a daisy chain line driver;
- a controller external to the string of devices; and
- a single bit bi-directional connection line connecting each device in the string to an upstream and/or downstream device in the string;
- wherein the bottommost device in the string is operable to receive a message initiated from the controller, the message being addressed to one or more of the intermediate devices in the string, wherein the communication interfaces of the devices are operable to pass the message up the string from one device to the next over the bi-directional connection line until all the devices in the string have received the message;
- wherein the one or more devices to which the message is addressed are operable to execute a command contained in the message; and
- wherein the daisy chain line driver of the communication interface of each device in the string is operable to transmit a data frame over the bi-directional connection line in a direction toward the bottommost device in the string, wherein the topmost device in the string serves as a master for initiating all downstream data transmissions from the devices to be sent in the direction of the bottommost device in response to the message addressed to the one or more of the intermediate devices, and wherein transmissions from the devices over the bi-directional connection line in the direction of the bottommost device use a token-based communication technique.

24. The system of claim 23 wherein each device in the string is operable to transmit a data frame containing a token regardless of whether or not the message from the controller was addressed to that device.

25. The system of claim 24 wherein the data frames from the one or more devices to which the message from the controller was addressed include measured data followed by the token.

26. The system of claim 24 wherein each device in the string is operable to count tokens received on the bi-directional connection line from upstream devices in the string to determine whether a number of counted tokens matches a predetermined number for that device and is further operable to insert its data frame after it determines that the number of counted tokens matches the predetermined number for that device.

27. The system of claim 26 wherein the predetermined number for each device depends on a position of that device within the string.

28. The method of claim 7 wherein each of the one or more devices to which the message from the external controller was addressed transmits a data frame containing the token regardless of whether or not that device has data to transmit.

29. The method of claim 1, further comprising:
- determining whether each device is idle;
- in response to determining that a particular device is idle, generating a time stamp indicating when that device was determined to be idle.

30. The method of claim 29, wherein time stamp comprises, for each device that is idle, an offset value and a position dependent value corresponding to that device.

31. The method of claim 1, wherein executing the command contained in the message comprises accessing information regarding one or more battery cells associated with the one or more devices to which the message is addressed.

* * * * *

UNITED STATES PATENT AND TRADEMARK OFFICE
CERTIFICATE OF CORRECTION

| | |
|---|---|
| PATENT NO. | : 9,294,300 B2 |
| APPLICATION NO. | : 13/442446 |
| DATED | : March 22, 2016 |
| INVENTOR(S) | : Thomas Janz et al. |

Page 1 of 1

It is certified that error appears in the above-identified patent and that said Letters Patent is hereby corrected as shown below:

ON THE TITLE PAGE

Column 2 (Other Publications) Line 3, please delete "(2001)." and insert --(2011).--, therefor.

IN THE SPECIFICATION

In column 5 Line 59, please delete ""I"," and insert --""1","--, therefor.

Signed and Sealed this
Thirty-first Day of May, 2016

Michelle K. Lee
*Director of the United States Patent and Trademark Office*